United States Patent
Kim et al.

(10) Patent No.: US 12,327,994 B2
(45) Date of Patent: Jun. 10, 2025

(54) BATTERY PROTECTION APPARATUS AND BATTERY SYSTEM INCLUDING THE SAME

(71) Applicant: SAMSUNG SDI CO., LTD., Yongin-si (KR)

(72) Inventors: Keunyoung Kim, Yongin-si (KR); Hyun Kim, Yongin-si (KR); Sunho Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/664,196

(22) Filed: May 19, 2022

(65) Prior Publication Data

US 2022/0376489 A1    Nov. 24, 2022

(30) Foreign Application Priority Data

May 20, 2021 (KR) .................. 10-2021-0064943

(51) Int. Cl.
*H02H 7/18* (2006.01)
*H02H 1/00* (2006.01)
*H02J 7/00* (2006.01)

(52) U.S. Cl.
CPC ............ *H02H 7/18* (2013.01); *H02H 1/0007* (2013.01); *H02J 7/0029* (2013.01)

(58) Field of Classification Search
CPC .......... B60L 3/0046; B60L 3/04; B60L 58/10; B60Y 2200/91; B60Y 2200/92; G01R 19/165; G01R 19/16542; H01H 47/00; H01H 47/002; H01H 47/02; H01H 47/22; H02H 1/0007; H02H 7/18; H02J 2207/10; H02J 7/00; H02J 7/0013; H02J 7/0029; H02J 7/0031; H02J 7/0063; H02J 7/007; H02J 9/061; Y02E 60/10; Y02T 10/70
(Continued)

(56) References Cited

U.S. PATENT DOCUMENTS 5,488,283 A * 1/1996 Dougherty .......... H01M 10/122
                                                    320/145
8,749,193 B1 * 6/2014 Sullivan .................... H02J 1/08
                                                    307/10.7
(Continued)

FOREIGN PATENT DOCUMENTS

CN    103085665 A    5/2013
CN    107521441 A    12/2017
(Continued)

OTHER PUBLICATIONS

Office Action, corresponding Korean Patent Application No. 10-2021-0064943 dated Apr. 12, 2023, 5 pages.
(Continued)

*Primary Examiner* — Jared Fureman
*Assistant Examiner* — Nicolas Bellido
(74) *Attorney, Agent, or Firm* — Womble Bond Dickinson (US) LLP

(57) ABSTRACT

A battery protection apparatus according to one or more embodiments includes a high voltage switch connected between a high voltage battery module and an external load, a battery configured to supply power to operate the high voltage switch, and a switch control circuit configured to output a signal to control the high voltage switch to be opened when an abnormality occurs in the battery.

12 Claims, 6 Drawing Sheets

(58) Field of Classification Search
USPC .................................................... 307/10.7
See application file for complete search history.

(56) References Cited

U.S. PATENT DOCUMENTS

| | | | | |
|---|---|---|---|---|
| 8,917,039 | B2* | 12/2014 | Yugo | ............... B60L 58/20 |
| | | | | 318/34 |
| 9,365,115 | B2* | 6/2016 | Ferrel | ............... B60L 58/12 |
| 10,358,043 | B2 | 7/2019 | Dao et al. | |
| 10,442,373 | B2 | 10/2019 | Yoon et al. | |
| 11,084,380 | B2* | 8/2021 | Seta | ............... B60W 10/26 |
| 11,190,046 | B2* | 11/2021 | Senoue | ............... H02J 9/06 |
| 2005/0068003 | A1* | 3/2005 | Gauthier | ............ B60L 50/16 |
| | | | | 320/104 |
| 2011/0127830 | A1* | 6/2011 | Harding | ............ B60R 16/033 |
| | | | | 307/10.7 |
| 2013/0106320 | A1 | 5/2013 | Yugo | |
| 2013/0113430 | A1* | 5/2013 | Kim | ............... H02J 7/0032 |
| | | | | 320/136 |
| 2013/0154352 | A1 | 6/2013 | Tokarz et al. | |
| 2013/0241496 | A1 | 9/2013 | Kurayama | |
| 2014/0312849 | A1* | 10/2014 | Lee | ............... H02J 7/0031 |
| | | | | 320/134 |
| 2017/0361791 | A1 | 12/2017 | Yoon et al. | |
| 2018/0056806 | A1 | 3/2018 | Dulle | |
| 2018/0354375 | A1 | 12/2018 | Dao et al. | |
| 2019/0044376 | A1 | 2/2019 | Senoue | |
| 2020/0016980 | A1 | 1/2020 | Seta et al. | |
| 2021/0028632 | A1 | 1/2021 | Hofer et al. | |
| 2022/0093984 | A1* | 3/2022 | Cho | ............... B60L 3/04 |

FOREIGN PATENT DOCUMENTS

| | | |
|---|---|---|
| CN | 109075580 A | 12/2018 |
| CN | 109641532 A | 4/2019 |
| CN | 110015160 A | 7/2019 |
| JP | 2008-062688 A | 3/2008 |
| JP | 2010-193670 A | 9/2010 |
| JP | 2015216776 A | 12/2015 |
| JP | 2020-11529 A | 1/2020 |
| KR | 10-2013-0141427 A | 12/2013 |
| KR | 10-2019-0017298 A | 8/2017 |
| KR | 10-2021-0013520 A | 2/2021 |
| WO | WO 2018/044336 A1 | 3/2018 |

OTHER PUBLICATIONS

Extended European Search Report; Application Serial No. 22174390.9, dated Nov. 2, 2022; 7 pages.
Chinese Office Action for CN Application No. 20221556790.6, dated Apr. 30, 2025, 9 pages.

* cited by examiner

BATTERY PROTECTION APPARATUS AND BATTERY SYSTEM INCLUDING THE SAME

CROSS-REFERENCE TO RELATED APPLICATION

This application claims priority to, and the benefit of, Korean Patent Application No. 10-2021-0064943 filed in the Korean Intellectual Property Office on May 20, 2021, the entire contents of which are incorporated herein by reference.

BACKGROUND

(a) Field

The present disclosure relates to a battery protection apparatus, and a battery system including the same.

(b) Description of the Related Art

A rechargeable battery, or secondary battery, is different from a primary battery, which only provides a non-reversible conversion of a chemical material into electrical energy, in that charging and discharging may be repeated.

A low-capacity rechargeable battery is used as a power supply device for small electronic devices such as portable phones, laptop computers, and camcorders, and a high-capacity rechargeable battery is used as a power supply device, such as electric vehicles (EVs), hybrid vehicles (HVs), an energy storage system (ESS) using medium-to-large batteries for home or for industry, or an uninterruptible power supply (UPS) system.

To satisfy a dynamic power demand of various electricity consumers connected to the battery system, static control of the battery power output and the charging is not sufficient. Therefore, information is suitably exchanged continuously or intermittently between the battery system and the controllers of the electricity consumers. This information includes an actual or predicted power demand, or actual or predicted consumer surplus, as well as an actual state of charge (SoC) of the battery system, potential electrical performances, charging capacities, and internal resistances.

For monitoring, controlling, and/or setting of the aforementioned parameters, the battery system includes control electronics. Such control electronics may be integral parts of the battery system, and may be located within a common housing, or may be a part of a remote controller that communicates with the battery system via an appropriate communication bus. The control electronics may perform various functions in the battery system.

The control electronics of the battery system, for example, a battery system (BSM), a battery management system (BMS), a battery monitoring unit (BMU), or a system basis chip (SBC) may receive power by the battery system controlled by them. In this way, an additional power supply for the control electronics may be omitted, thereby reducing the size of a suitable installation space of the battery system. However, depending on the output voltage of the battery system, the battery system of a high voltage such as, for example, 48 V may suitably adjust the output voltage to supply the power to the control electronics.

The battery system may further include a protection system that provides voltage level control of a power interface of the battery system, and that enables fast and reliable safe shutdown of the power interface in a case of an unacceptable operating condition. This protection system may be configured to cut off the power connection between the battery system and the outer terminal of the battery system. Typically, the protection system includes an electromechanical switch, which is controlled by a microcontroller unit (MCU) of the battery system.

In general, at least one relay controlled by a relay driving circuit is used as an electromechanical switch of the protection system. A relay coil of the relay is operated by the battery system of a low voltage. If the operating power from the low voltage battery system is not normally supplied, there is a problem that physical damage to the relay may occur.

The above information disclosed in this Background section is only for enhancement of understanding of the background, and therefore it may contain information that does not form the prior art.

SUMMARY

Embodiments of the present disclosure enable normal operation of a relay.

Embodiments of the present disclosure enable protection of a relay.

Embodiments of the present disclosure enable operation of a relay even in an instantaneous operating power abnormal supply situation.

A battery protection apparatus according to one or more embodiments includes a high voltage switch connected between a high voltage battery module and an external load, a battery configured to supply power to operate the high voltage switch, and a switch control circuit configured to output a signal to control the high voltage switch to be opened when an abnormality occurs in the battery.

The battery protection apparatus may further include a controller configured to output a signal to control the high voltage switch to maintain an open state based on a state of the battery.

The controller may be configured to control the switch control circuit to stop output of the signal of the switch control circuit after the controller outputs the signal of the controller.

The battery protection apparatus may further include a converter configured to convert a voltage of the battery into an operation voltage to be output, and a power supply configured to regulate the operation voltage to be applied as a driving voltage to the switch control circuit, and to output a control signal according to a detection of a malfunction of the controller, wherein the switch control circuit is configured to output the signal to control the high voltage switch based on a magnitude of the operation voltage.

The switch control circuit may include a comparator configured to compare the operation voltage and a first threshold voltage, and to output a comparison signal, a latch-off circuit configured to output a control signal based on a level of the comparison signal, and an AND gate circuit configured to receive the signal of the controller, the control signal of the latch-off circuit, and the control signal of the power supply, and configured to output the signal to control the high voltage switch.

The comparator may be configured to change the comparison signal from an enable level to a disable level when the operation voltage is less than a first threshold voltage, wherein the comparator is configured to change the comparison signal from the disable level to the enable level when the operation voltage is greater than a second threshold voltage that is greater than the first threshold voltage.

The switch control circuit may include a filter configured to receive the operation voltage, a comparator configured to compare an output voltage of the filter and a threshold voltage, and to output a comparison signal, a latch-off circuit configured to output a control signal based on a level of the comparison signal, and an AND gate circuit configured to receive the signal of the controller, the control signal of the latch-off circuit, and the control signal of the power supply, and configured to output a signal to control the high voltage switch.

The switch control circuit may include a timer configured to output a comparison signal by determining whether a time during which the operation voltage is less than a threshold voltage is equal to or greater than a threshold amount of time, a latch-off circuit configured to output a control signal based on a level of the comparison signal, and an AND gate circuit configured to receive the signal of the controller, the control signal of the latch-off circuit, and the control signal of the power supply, and configured to output a signal for controlling the high voltage switch.

The high voltage switch may include a coil configured to receive an operation voltage, and at least one of a high voltage side driver and a low voltage side driver that is configured to apply the operation voltage to the coil based on the signal to control the high voltage switch.

A battery protection method, for controlling a high voltage switch connected between a high voltage battery module and an external load according to one or more embodiments, includes receiving an operation voltage, from which a voltage of a battery supplying a power to operate the high voltage switch is converted, from a converter through a switch control circuit, outputting, through the switch control circuit, a signal to control the high voltage switch to be opened when the operation voltage is less than a threshold voltage, outputting, through the controller, a signal to control the high voltage switch to maintain an open state based on a state of the battery, and controlling, through the controller, the switch control circuit to stop the signal that is output from the switch control circuit after the controller outputs the signal.

A battery system according to one or more embodiments includes a high voltage battery module the battery protection of the one or more embodiments mentioned above.

A vehicle according to one or more embodiments includes an external load comprising a motor and an inverter, a high voltage battery module, and the battery protection of the one or more embodiments mentioned above.

Accordingly, there is an aspect of embodiments that may reduce or prevent the likelihood of physical damage to the relay connected to the battery system.

Accordingly, there is an aspect of embodiments that may provide a robust protection system even during abnormal supply of operating power.

Accordingly, there is an aspect of embodiments that may reduce or prevent the likelihood of an additional accident caused by the battery.

DETAILED DESCRIPTION

Figure 1:
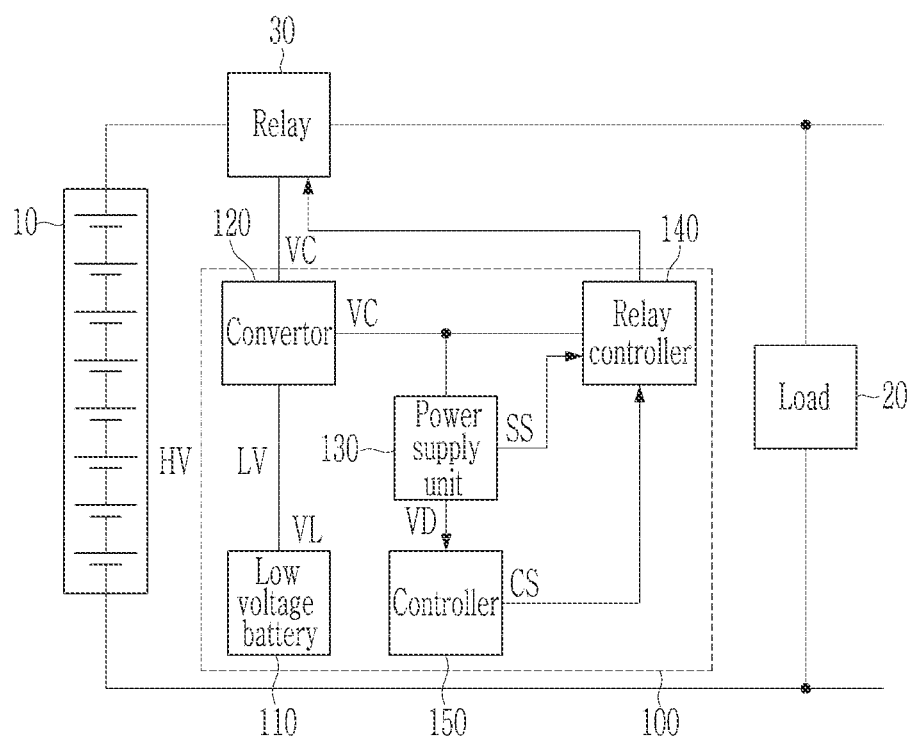
FIG. 1 is a block diagram schematically showing a battery system according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

Further, processes, elements, and techniques that are not deemed necessary to a person of ordinary skill in the art may not be described for full understanding of aspects of the present disclosure. In the drawings, relative sizes of elements, layers, and regions may be exaggerated for clarity, and regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Also, when the term "substantially" is used in combination with a characteristic that can be expressed using a numerical value, the term "substantially" denotes a range of +/−5% of the value centered on the numerical value.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram schematically showing a battery system according to one or more embodiments.

FIG. 1 shows that a battery system according to one or more embodiments may be applied to a vehicle, and in addition to the vehicle, may be applied to any technical field to which a secondary battery may be applied, such as an energy storage system (ESS) for home or industry, or such as an uninterruptible power supply (UPS) system.

The case where the battery system of FIG. 1 is applied to the vehicle is described as an example. The battery system is an electrical energy source that provides a driving force to the motor to drive the vehicle. The high voltage battery module 10 of the battery system is connected to a load 20. The load 20 includes at least one of an inverter, a motor, etc.

In the high voltage battery module 10, a plurality of unit battery cells are coupled in series and/or in parallel. Here, a type of the high voltage battery module 10 is not particularly limited, and may include a lithium ion battery, a lithium polymer battery, a nickel cadmium battery, a nickel hydrogen battery, a nickel zinc battery, and the like.

In addition, the high voltage battery module 10 may be charged by a connection to an external power source, and may be charged or discharged by an inverter according to the driving of the motor and/or an internal combustion engine. The high voltage battery module 10 may be charged or discharged by a charging current or a discharge current.

A relay 30 to protect the high voltage battery module 10 may be positioned on the charge/discharge path of the high voltage battery module 10. The relay 30 may perform a protection operation for the high voltage battery module 10. The relay 30 receives an operation voltage VC from a switch control circuit 100, and may be operated under the control of the switch control circuit 100.

In addition to the relay 30, a switch that is strong against (e.g., that is suitable for) high/low voltage and high current, such as a contactor, may be used. These high voltage switches include a coil for a switching operation, a driver that controls the switching (opening and closing) of the high voltage switch by switching the control voltage applied to the coil, and a contact point (a node) that may be opened/closed by an operation depending on the voltage applied to the coil by the driver. The driver operates at low voltage (LV).

The battery system may further include the switch control circuit 100 mentioned above for controlling the opening and closing of the relay 30. The switch control circuit 100 includes a low voltage battery 110, a converter 120, a power supply (e.g., a power supply unit) 130, a relay controller 140, and a controller 150.

The converter 120 is connected to the low voltage battery 110. The converter 120 may output the operation voltage VC based on the voltage LV of the low voltage battery 110. For example, the converter 120 may transmit the operation voltage VC to the relay 30, and the power supply 130 and the relay controller 140 in the switch control circuit 100. The converter 120 may output the voltage LV of the low voltage battery 110 by a stepping-up and/or stepping-down process. The converter 120 may be configured as a buck-boost converter as a DC-DC converter, but the type of the converter 120 is not limited thereto.

The power supply (e.g., a system basis chip (SBC)) 130 is an integrated circuit in which a voltage regulator, a supervisor function, a reset generator, a watchdog function, a bus interface, and a wakeup logic are integrated.

The power supply 130 may detect a fault of the controller 150. To this end, the power supply 130 may continuously (e.g., substantially continuously) communicate with the controller 150, and may determine the malfunction of the controller 150 from the communication state with the controller 150. In addition, the power supply 130 may periodically receive a fault detection signal from the controller 150 to detect the malfunction of the controller 150, and may determine the malfunction of the controller 150 according to the reception state of the fault detection signal (e.g., a reception status, a pulse width, a reception period, etc.).

The power supply 130 may operate as an auxiliary controller for controlling the driver instead of the controller 150 when the malfunction of the controller 150 is detected. The power supply 130 may output a control signal (e.g., a safety signal (SS)) for controlling the relay controller 140 to the relay controller 140, and may change the level of the control signal SS according to the detection of the malfunction of the controller 150. For example, while the controller 150 operates normally, the level of the control signal SS may be maintained at a high level, and when the malfunction of the controller 150 is detected, the level of the control signal SS may be changed to a low level.

The controller (e.g., a microcontroller unit (MCU)) 150 is a main controller for applying a control signal CS to the relay controller 140, and may output the control signal CS for controlling the relay controller 140 based on the state information (e.g., a voltage, a current, an SoC, etc.) of the high voltage battery module 10 and the low voltage battery 110, the state information of the vehicle, a vehicle driving mode, and the like.

The relay controller 140 controls the opening and closing of the relay 30 based on the operation voltage VC applied from the converter 120, the control signal SS applied from the power supply 130, and the control signal CS applied from the controller 150.

The relay controller 140 switches the relay 30 when the operation voltage VC is not normally supplied. For example, the low voltage VL might not be applied to the converter 120 for a short period of a time (e.g., from about 1 microsecond to about 1 millisecond), or a glitch may occur in which the low voltage VL value is unintentionally changed. In this case, the operation voltage VC to drive the coil of relay 30 drops. In response to the glitch phenomenon occurring for a short time, it may be difficult for the power supply 130 and the controller 150 to immediately output the control signals SS and CS. This is because it may take more than about 1 millisecond for the power supply 130 and the controller 150 to process the low voltage VL or the operation voltage VC through digital signal processing.

When the operation voltage VC is supplied abnormally, the relay controller 140 stops the operation of the relay 30 (e.g., opens the relay 30) so that the relay 30 is not burned or fused by the abnormal operation voltage VC provided to the relay 30.

In addition, even after the control signal CS for controlling the relay 30 in response to the glitch is output by the controller 150, the operation of the relay is maintained for an amount of time (e.g., a predetermined time, or a threshold amount of time), which may be different depending on the design. Therefore, the relay 30 is continuously (e.g., substantially continuously) controlled by the relay controller 140 and the controller 150, thereby reducing or preventing chattering (e.g., where a manual switch repeatedly turns on and off in a short time because of vibration of the contact).

Next, the protection method of the relay 30 is described in detail with reference to FIG. 2.

Figure 2:
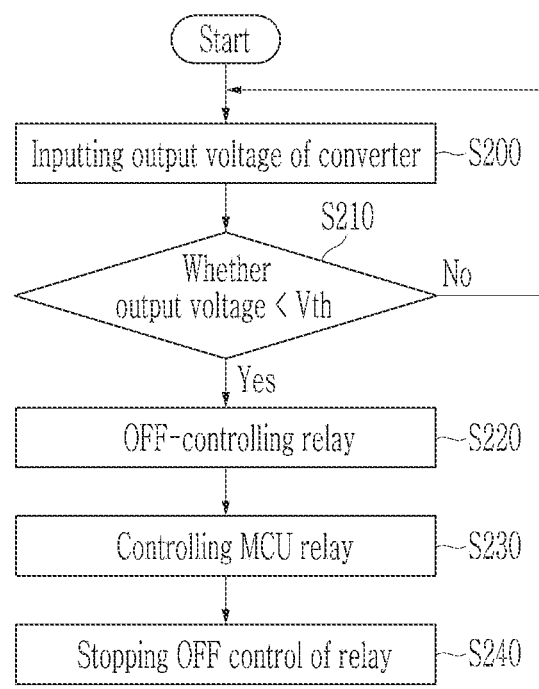
FIG. 2 is a flowchart showing a battery protection method according to one or more embodiments.

FIG. 2 is a flowchart showing a battery protection method according to one or more embodiments.

Referring to FIG. 2, the relay controller 140 receives the operation voltage VC output from the converter 120 (S200).

If the operation voltage VC of the converter 120 is greater than or equal to the threshold voltage Vth ("No" of S210), the relay controller 140 continues to receive the operation voltage VC of the converter 120 (S200).

If the operation voltage VC of the converter 120 is less than the threshold voltage Vth ("Yes" of S210), the relay controller 140 controls the relay 30 to stop the operation of the relay 30 (S220).

The controller 150 controls the operation of the relay 30 (S230).

Then, the relay controller 140 stops the control of the relay 30 (S240).

Next, a battery protection apparatus is described in detail with reference to FIG. 3.

Figure 3:
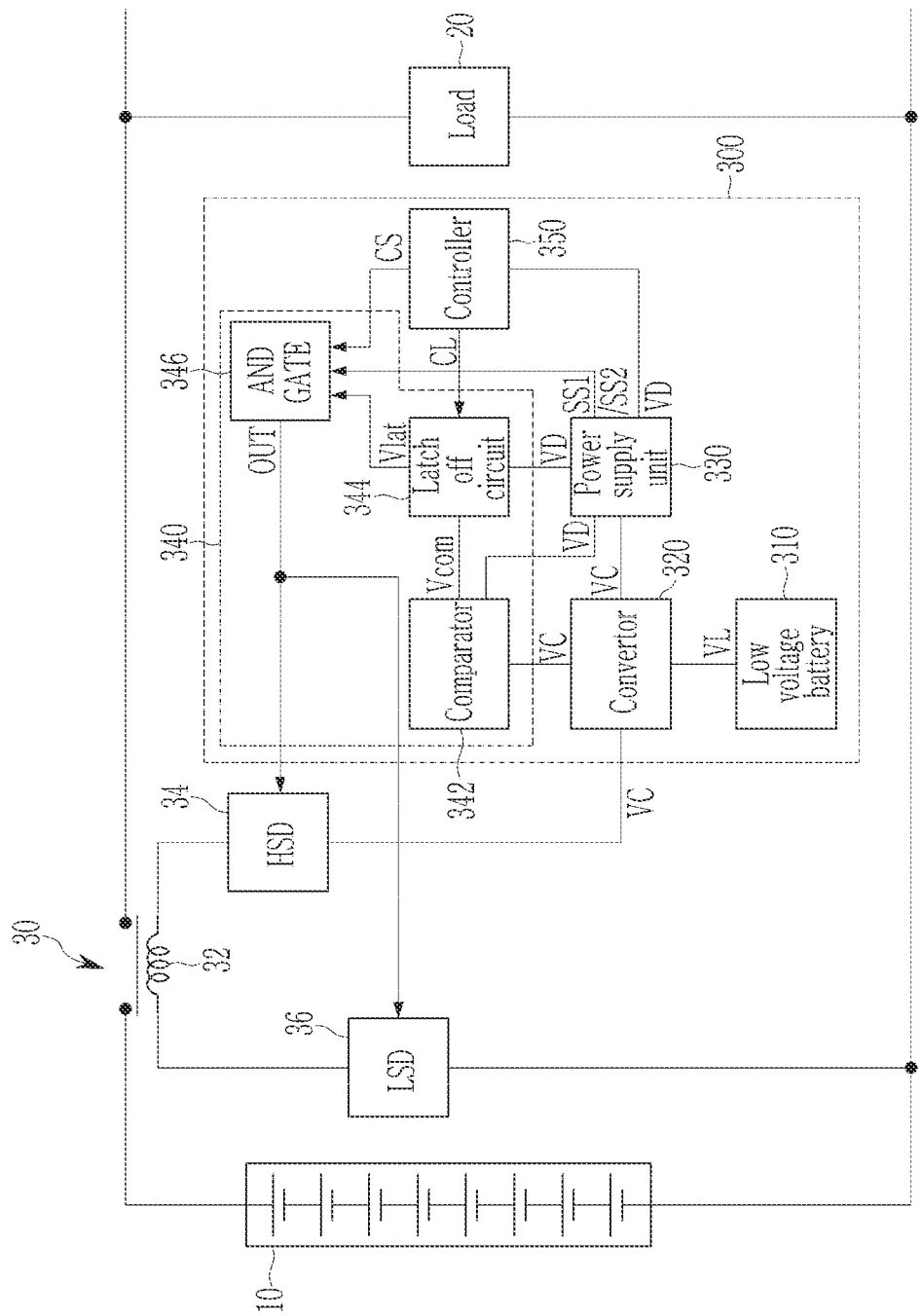
FIG. 3 is a block diagram showing an example of a battery protection system of FIG. 1 in detail.

FIG. 3 is a block diagram showing an example of a battery protection system of FIG. 1 in detail.

As shown in FIG. 3, a switch control circuit 300 for the opening and closing of the relay 30 includes a low voltage battery 310, a converter 320, a power supply 330, a relay controller 340, and a controller 350. The relay controller 340 includes a comparator 342, a latch-off circuit 344, and an AND gate circuit 346.

The power supply 330 receives the operation voltage VC and transmits a regulated voltage VD to the comparator 342, the latch-off circuit 344, and the controller 350. The voltage VD is used to drive the comparator 342, the latch-off circuit 344, and the controller 350.

The comparator 342 receives the operation voltage VC from the converter 320. The comparator 342 may have amplitude hysteresis. The comparator 342 compares the operation voltage VC and the threshold voltage, and then outputs a comparison signal Vcom.

The latch-off circuit 344 outputs a control signal Vlat according to the level of the comparison signal Vcom. When the level of the comparison signal Vcom is changed (e.g., when the operation voltage VC is less than the first threshold voltage), the latch-off circuit 344 changes the level of the control signal Vlat. When the level of the comparison signal Vcom is changed (e.g., when the operation voltage VC is equal to or greater than the second threshold voltage), the level of the control signal Vlat is changed after the level of the control signal Vlat is maintained for a period (e.g., a predetermined period).

The AND gate circuit 346 receives the control signal Vlat, a control signal SS1/SS2 from the power supply 330, and the control signal CS, and outputs the switch control signal OUT that controls the high voltage side driver 34 and the low voltage side driver 36. The AND gate circuit 346 outputs the switch control signal OUT of the enable level when all of the input signals are at the enable level. Then, the operation voltage VC is applied to the coil 32 through the high voltage side driver 34 and the low voltage side driver 36, and the relay 30 is closed. The AND gate circuit 346 outputs the switch control signal OUT of the disable level when at least one of the input signals is the disable level. Then, at least one of the high voltage side driver 34 and the low voltage side driver 36 stops applying the operation voltage VC to the coil 32, and then the relay 30 opens.

The controller 350 outputs the control signal CS to the AND gate circuit 346. When the glitch occurs in the low voltage VL, the controller 350 may change the level of the control signal CS based on the glitch. When a time (e.g., a predetermined time, or a threshold amount of time) elapses after changing the level of the control signal CS, the controller 350 outputs the signal CL for clearing the latch-off circuit 344. The latch-off circuit 344 is cleared by the signal CL (e.g., the level of the control signal Vlat is changed to the enable level).

In relation to this, the operation of the battery protection system is described with reference to FIG. 4 together.

Figure 4:
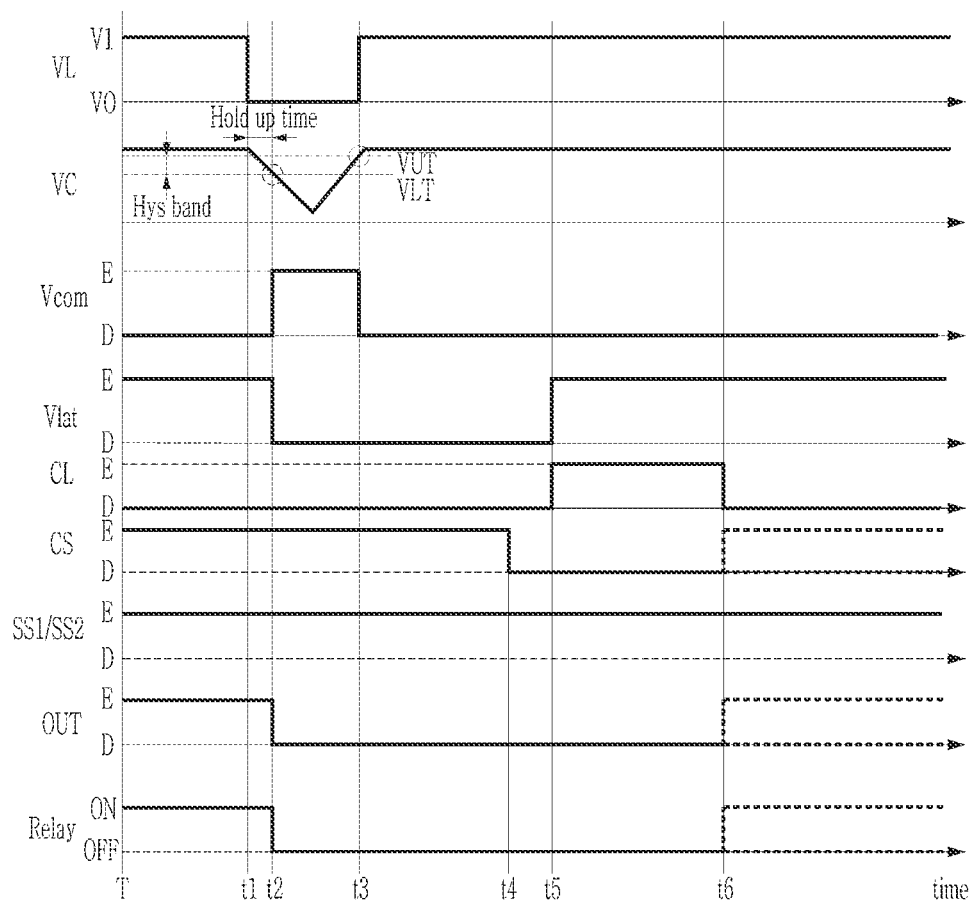
FIG. 4 is a graph showing a signal of a case in which a battery protection system according to one or more embodiments is operated.

FIG. 4 is a graph showing signals of a case in which a battery protection system of one or more embodiments operates.

Referring to FIG. 4, the low voltage VL is supplied with a level V1 before t1. At t1, the glitch occurs in the low voltage battery 310, and the low voltage VL is supplied with a level V0 (V1>V0). The operation voltage VC output from the converter 320 is lowered by the low voltage VL of the level V0. In the present disclosure, it is assumed that the level V1 is about 12 V and the level V0 is about 0 V, although the level V1 and the level V0 of the low voltage VL are not limited to the above values.

When the level of the operation voltage VC at t2 is lower than the second threshold voltage VLT of the comparator 342, the comparator 342 outputs the comparison signal Vcom of the enable level. Then, the latch-off circuit 344 receiving the comparison signal Vcom of the enable level outputs the control signal Vlat of the disable level D. When the control signal Vlat of the disable level D is input to the AND gate circuit 346, the AND gate circuit 346 outputs the switch control signal OUT of the disable level D. The high voltage side driver 34 and/or the low voltage side driver 36 stop applying the operation voltage VC to the coil 32, and the relay 30 opens (OFF).

Accordingly, even if the glitch occurs for about 1 microsecond to about 1 millisecond in the low voltage battery 310 that supplies the voltage for controlling the relay 30, the relay 30 is controlled to be opened, so that the likelihood of the fusion of the relay 30 may be reduced or prevented.

At t3, when the level of the operation voltage VC by the converter 320 becomes above the first threshold voltage VUT, the comparator 342 outputs the comparison signal Vcom of the disable level D. If the low voltage VL remains with the level V0 even after t3, the level of the operation voltage VC falls again.

The latch-off circuit 344 that has received the comparison signal Vcom of the disable level D maintains the control signal Vlat of the disable level D until a clear signal CL for clearing the latch-off circuit 344 is received (t5).

At t4, the controller 350 outputs the control signal CS to the AND gate circuit 346. When the glitch occurs in the low voltage VL, the controller 350 changes the level of the control signal CS into the disable level D based on the glitch.

At t5, the controller 350 outputs the clear signal CL of the enable level E to clear the latch-off circuit 344. Then, the latch-off circuit 344 outputs the control signal Vlat of the enable level E.

At t6 when the latch-off circuit 344 is cleared and a period (e.g., a predetermined period) has elapsed, the controller 350 outputs the clear signal CL of the disable level D. Therefore, when the glitch occurs, after the relay 30 is quickly or immediately changed to the OFF state by the comparator 342 of an analog circuit, as the relay 30 is controlled to the OFF state by the controller 350 of a digital circuit, it is possible to reduce or prevent the likelihood of a frequent state change of the relay 30.

Next the battery protection apparatus is described in detail with reference to FIG. 5.

Figure 5:
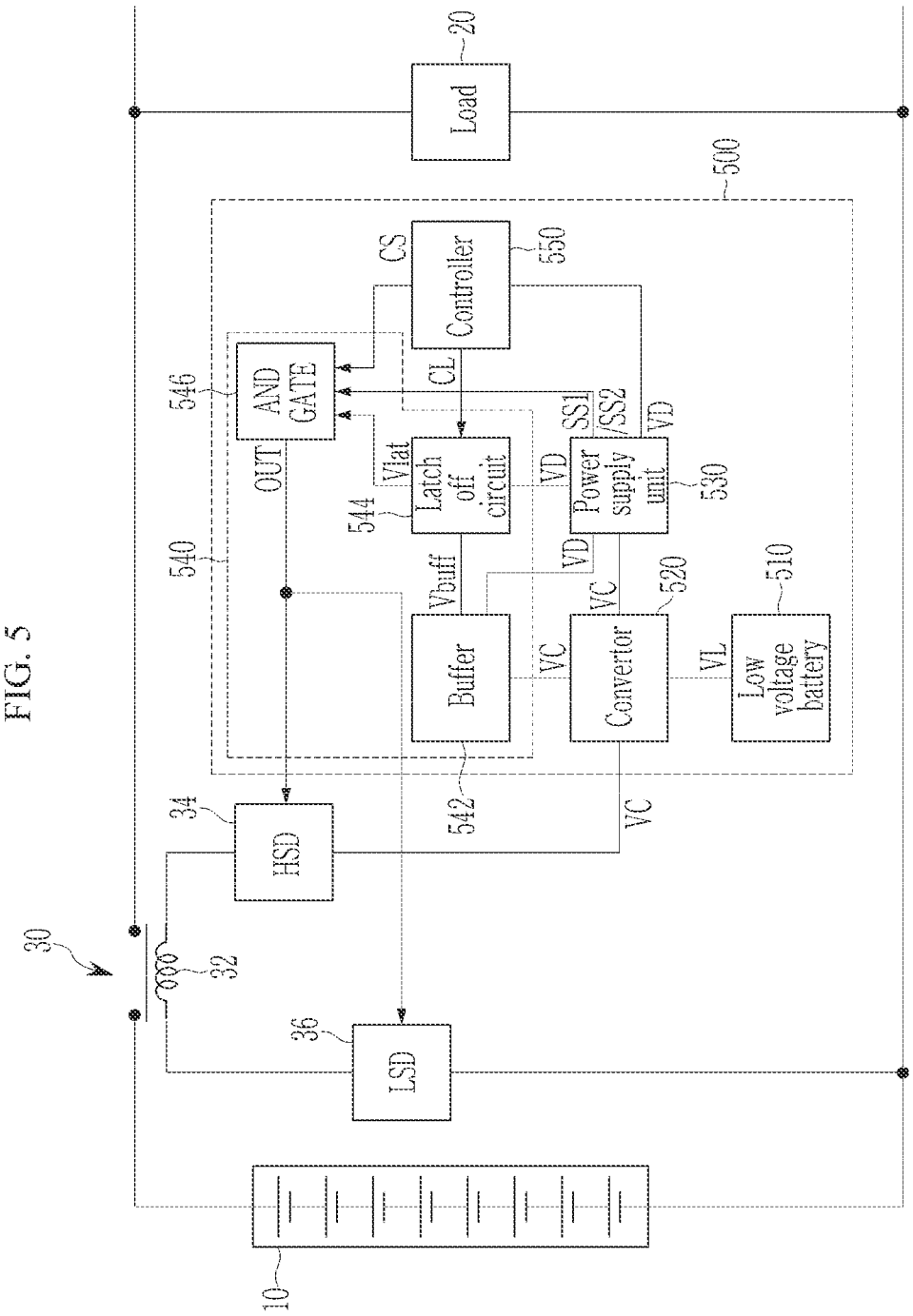
FIG. 5 is a block diagram showing another example of a battery protection system of FIG. 1 in detail.

FIG. 5 is a block diagram showing another example of a battery protection system of FIG. 1 in detail.

As shown in FIG. 5, the switch control circuit 500 for controlling the opening and closing of the relay 30 includes a low voltage battery 510, a converter 520, a power supply 530, a relay controller 540, and a controller 550.

Compared with the battery protection system of FIG. 3, repeated description of the same or similar constituent elements may be omitted.

The relay controller 540 includes a buffer 542, a latch-off circuit 544, and an AND gate circuit 546.

The buffer 542 receives the operation voltage VC from the converter 520. The buffer 542 may include a low pass filter (LPF), and a comparator connected to the low pass filter. The operation voltage VC is applied to the low pass filter. The comparator compares the voltage output from the low pass filter with the reference voltage, and outputs a buffer signal Vbuff. When the operation voltage VC input to the low pass filter decreases, the output voltage level of the low pass filter gradually decreases. The low pass filter may be a moving average filter, and may output the average value of the falling operation voltage VC. When the low voltage VL is at the level V0 for a time (e.g., a predetermined time, or a threshold amount of time), for example, about 1 microsecond or more, the voltage output from the low pass filter is lowered by the falling operation voltage VC, and if the output voltage of the low pass filter is lower than the reference voltage of the comparator, the comparator outputs the buffer signal Vbuff of the enable level E. That is, the buffer 542 may detect a power supply glitch of about 1 microsecond or longer by using the low pass filter.

Similarly, the latch-off circuit 544 outputs the control signal Vlat according to the level of the buffer signal Vbuff. The latch-off circuit 544 changes the level of the control signal Vlat when the level of the buffer signal Vbuff is changed (e.g., when the moving average of the operation voltage VC is less than the threshold voltage). When the level of the buffer signal Vbuff is changed (e.g., when the moving average of the operation voltage VC is greater than or equal to the threshold voltage), the level of the control signal Vlat is maintained for a period (e.g., a predetermined period), and then the level of the control signal Vlat is changed.

Next the battery protection apparatus is described in detail with reference to FIG. 6.

Figure 6:
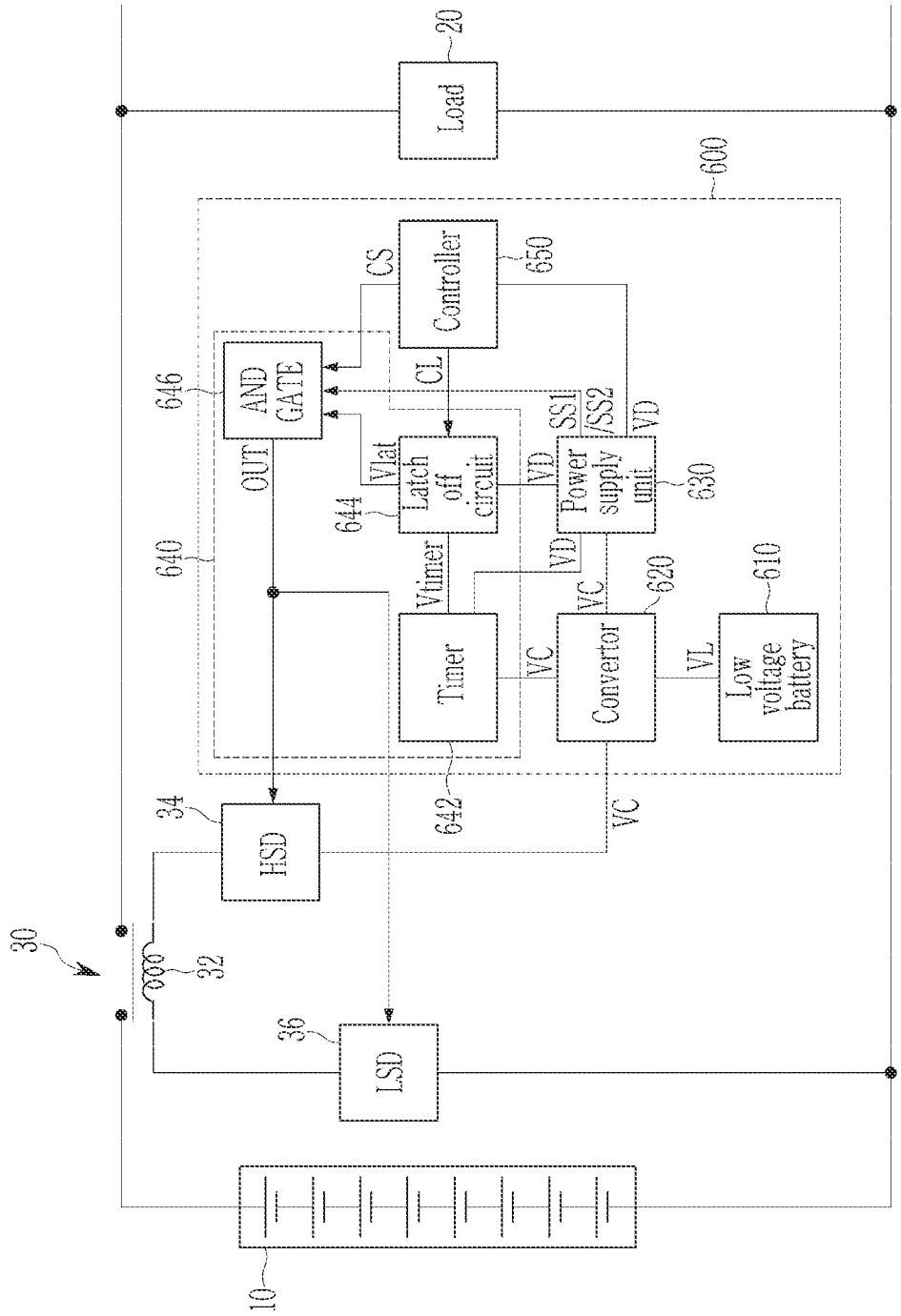
FIG. 6 is a block diagram showing another example of a battery protection system of FIG. 1 in detail.

FIG. 6 is a block diagram showing in detail another example of a battery protection system of FIG. 1.

As shown in FIG. 6, the switch control circuit 600 for controlling the opening and closing of the relay 30 includes a low voltage battery 610, a converter 620, a power supply 630, a relay controller 640, and a controller 650.

The relay controller 640 includes a timer 642, a latch-off circuit 644, and an AND gate circuit 646.

The timer 642 receives the operation voltage VC from the converter 620. The timer 642 outputs a timer signal Vtimer of the enable level E when a time when the operation voltage VC is lower than the threshold voltage is more than a threshold time (e.g., about 1 microsecond). That is, the timer 642 may detect a power glitch of about 1 microsecond or more.

Similarly, the latch-off circuit 644 outputs the control signal Vlat according to the level of the timer signal Vtimer. The latch-off circuit 644 changes the level of the control signal Vlat when the level of the timer signal Vtimer is changed (e.g., when the moving average of the operation voltage VC is less than the threshold voltage). When the level of the timer signal Vtimer is changed again (e.g., when the moving average of the operation voltage VC is greater than or equal to the threshold voltage), the level of the control signal Vlat is changed after the level of the control signal Vlat is maintained for a period (e.g., a predetermined period).

The high voltage switch to cut off the power connection between the battery system and the outer terminal of the battery system is operated by a low voltage battery. The glitch phenomenon of the low voltage battery causes the malfunction (e.g., re-closing) of the high voltage switch or a transient state (e.g., the voltage below the operation voltage), which may cause physical damage to the relay. If the relay burns out, it becomes difficult to cut off the power connection between the outer terminals of the battery system, and an accident occurs.

The battery protection apparatus according to one or more embodiments, and the battery system including the same, detects the occurrence of the power glitch of the low voltage battery by the hysteresis comparator of the analog circuit, the buffer, and the timer to thereby open the relay. Thus, there are aspects of reducing or preventing the likelihood of the physical damage to the relay, and reducing or preventing the likelihood of other accidents caused by the batteries.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims, with functional equivalents thereof to be included therein.

What is claimed is:

1. A battery protection apparatus comprising:
   a high voltage switch connected between a high voltage battery module and an external load;
   a battery configured to supply a low voltage;
   a converter configured to convert the low voltage from the battery into an operation voltage to be output to operate the high voltage switch; and
   a switch control circuit configured to output a signal to control the high voltage switch to be opened when an abnormality occurs in the battery, the abnormality corresponding to an instance when the low voltage is not applied to the converter.

2. The battery protection apparatus as claimed in claim 1, further comprising a controller configured to output a signal to control the high voltage switch to maintain an open state based on a state of the battery.

3. The battery protection apparatus as claimed in claim 2, wherein the controller is configured to control the switch control circuit to stop output of the signal of the switch control circuit after the controller outputs the signal of the controller.

4. A battery system comprising:
   the high voltage battery module; and
   the battery protection apparatus as claimed in claim 1.

5. The battery protection apparatus as claimed in claim 1, wherein a voltage of the high voltage battery module is about 48 V, and wherein the low voltage is about 12 V.

6. A battery protection apparatus comprising:
   a high voltage switch connected between a high voltage battery module and an external load;
   a battery configured to supply power to operate the high voltage switch;
   a switch control circuit configured to output a signal to control the high voltage switch to be opened when an abnormality occurs in the battery;
   a controller configured to output a signal to control the high voltage switch to maintain an open state based on a state of the battery;
   a converter configured to convert a voltage of the battery into an operation voltage to be output; and
   a power supply configured to regulate the operation voltage to be applied as a driving voltage to the switch control circuit, and to output a control signal according to a detection of a malfunction of the controller,
   wherein the switch control circuit is configured to output the signal to control the high voltage switch based on a magnitude of the operation voltage.

7. The battery protection apparatus as claimed in claim 6, wherein the switch control circuit comprises:
   a comparator configured to compare the operation voltage and a first threshold voltage, and to output a comparison signal;
   a latch-off circuit configured to output a control signal based on a level of the comparison signal; and
   an AND gate circuit configured to receive the signal of the controller, the control signal of the latch-off circuit, and the control signal of the power supply, and configured to output the signal to control the high voltage switch.

8. The battery protection apparatus as claimed in claim 7, wherein the comparator is configured to change the comparison signal from a disable level to an enable level when the operation voltage is less than the first threshold voltage, and
   wherein the comparator is configured to change the comparison signal from the enable level to the disable level when the operation voltage is greater than a second threshold voltage that is greater than the first threshold voltage.

9. The battery protection apparatus as claimed in claim 6, wherein the switch control circuit comprises:
   a filter configured to receive the operation voltage;

a comparator configured to compare an output voltage of the filter and a threshold voltage, and to output a comparison signal;

a latch-off circuit configured to output a control signal based on a level of the comparison signal; and an AND gate circuit configured to receive the signal of the controller, the control signal of the latch-off circuit, and the control signal of the power supply, and configured to output a signal to control the high voltage switch.

10. The battery protection apparatus as claimed in claim 6, wherein the switch control circuit comprises:

a timer configured to output a timer signal by determining whether a time during which the operation voltage is less than a threshold voltage is equal to or greater than a threshold amount of time;

a latch-off circuit configured to output a control signal based on a level of the timer signal; and an AND gate circuit configured to receive the signal of the controller, the control signal of the latch-off circuit, and the control signal of the power supply, and configured to output a signal for controlling the high voltage switch.

11. The battery protection apparatus as claimed in claim 6, wherein the high voltage switch comprises:

a coil configured to receive the operation voltage; and at least one of a high voltage side driver and a low voltage side driver that is configured to apply the operation voltage to the coil based on the signal to control the high voltage switch.

12. A battery protection method for controlling a high voltage switch connected between a high voltage battery module and an external load, the method comprising:

receiving an operation voltage, from which a voltage of a battery supplying a power to operate the high voltage switch is converted, from a DC-to-DC converter through a switch control circuit;

outputting, through the switch control circuit, a signal to control the high voltage switch to be opened when the operation voltage is less than a threshold voltage;

outputting, through a controller, a signal to control the high voltage switch to maintain an open state based on a state of the battery; and controlling, through the controller, the switch control circuit to stop the signal that is output from the switch control circuit after the controller outputs the signal.

* * * * *